United States Patent [19]

Matusch

[11] Patent Number: 5,458,056
[45] Date of Patent: Oct. 17, 1995

[54] EXTRACTION TOWER

[75] Inventor: Siegfried Matusch, Braunschweig, Germany

[73] Assignee: Braunschweigische Maschinen-Bauanstalt AG, Braunschweig, Germany

[21] Appl. No.: 132,242

[22] Filed: Oct. 6, 1993

[30] Foreign Application Priority Data

Oct. 7, 1992 [DE] Germany .......................... 42 33 680.5

[51] Int. Cl.⁶ .................................................. A23N 1/00
[52] U.S. Cl. .................................. 99/495; 99/510; 99/513
[58] Field of Search ........................ 99/495, 509, 510, 99/511, 513, 540, 547; 127/3, 5; 68/12.06

[56] References Cited

U.S. PATENT DOCUMENTS

| | | | |
|---|---|---|---|
| 1,653,281 | 12/1927 | Hess | 99/495 |
| 1,861,084 | 5/1932 | Goranson et al. | 99/547 |
| 2,088,657 | 8/1937 | Lindley | 99/513 |
| 2,679,273 | 5/1954 | Harrison | 99/540 |
| 2,776,557 | 1/1957 | Bruckman | 68/12.06 |
| 2,857,907 | 10/1958 | Kaether et al. | 99/495 |
| 3,691,938 | 9/1972 | Nichols | 99/348 |
| 3,726,715 | 4/1973 | Mushack | 127/5 |
| 4,177,722 | 12/1979 | van Olphen | 99/540 |
| 4,369,698 | 1/1983 | Hemfort et al. | 99/495 |
| 4,490,335 | 12/1984 | Marev et al. | 99/495 |

Primary Examiner—David A. Scherbel
Assistant Examiner—James F. Hook
Attorney, Agent, or Firm—Foley & Lardner

[57] ABSTRACT

An extraction tower for the extraction of slices includes an outer tower casing having an inside wall and a bottom region; arresters disposed along the inside wall; a sieve disposed in the bottom region; a tubular shaft centrally disposed in the casing and having a toothed rim at a top end thereof and conveyor vanes disposed over its length; a bearing which holds a bottom end of the tubular shaft; a rotary drive including a plurality of drive units which are distributed around a periphery of the tubular shaft and which are connected to the tower casing, each of the drive units including a drive pinion which engages the toothed rim; a plain bearing; a guide for guiding the bottom end in the bottom region near the sieve, the guide including a central journal which is disposed in the plain bearing as far as the sieve extends and wherein a clearance exists between the plain bearing and the central journal.

19 Claims, 4 Drawing Sheets

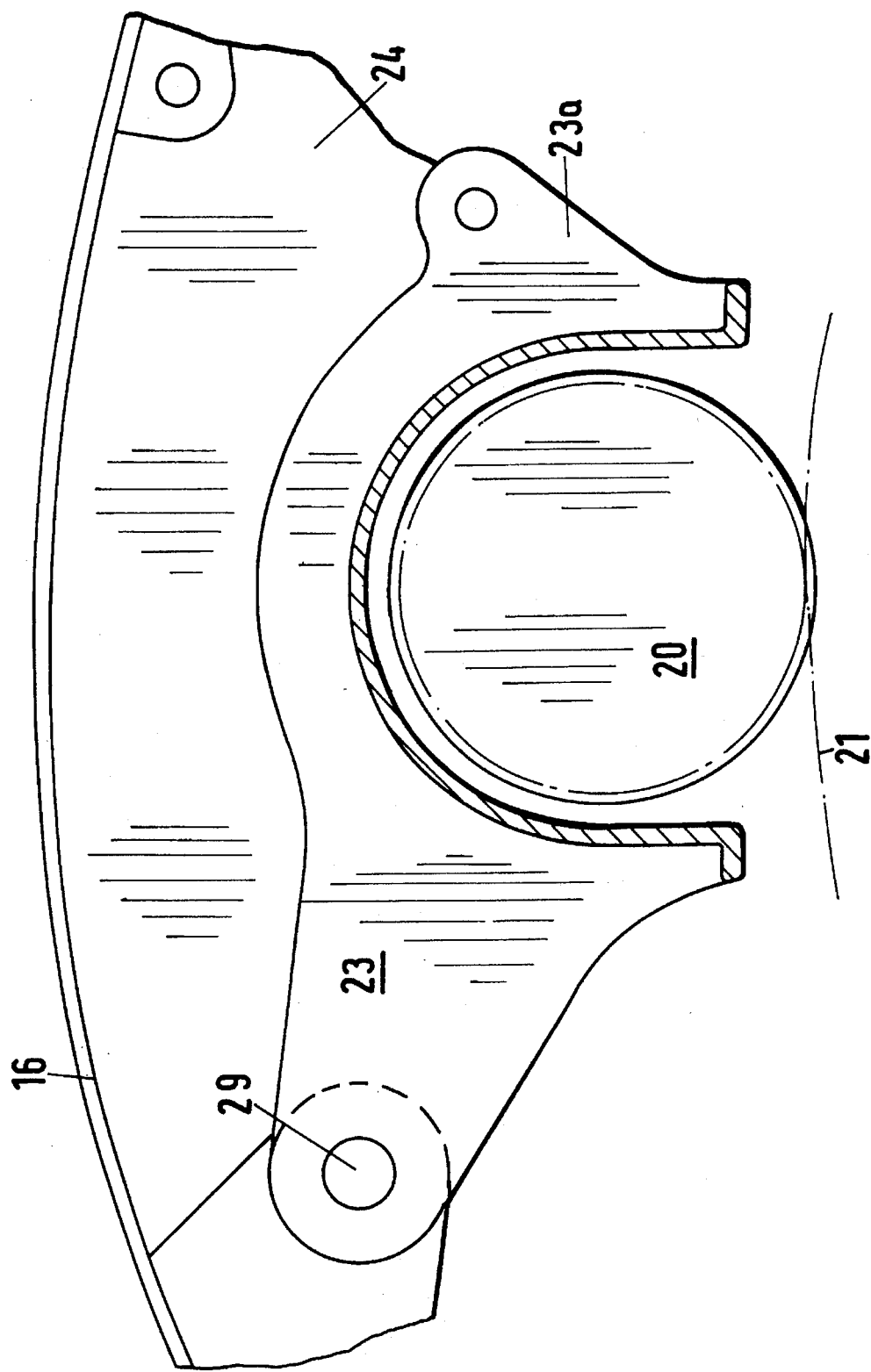

5,458,056

EXTRACTION TOWER

BACKGROUND OF THE INVENTION

1. Field of the Invention

The invention relates to an extraction tower for the extraction of juice from slices of fruit, having an outer tower casing equipped on its inside wall with arresters (baffles); a bottom sieve in a bottom region of the tower casing; and a central tubular shaft which is equipped over its length with conveyor vanes, is held at its bottom end in a bearing, and is acted on at its top end by a rotary drive. The rotary drive includes a plurality of drive units which are distributed around the periphery of the tubular shaft and which are connected to the tower casing. Each of the drive units engage, by means of a drive pinion, a toothed rim which is provided on the tubular shaft.

2. Description of the Related Art

In the previously known embodiment, the tubular shaft, whose diameter, for example, may be half the size of the diameter of the tower casing, is taken out centrally in the downward direction through the bottom of the casing. In this region, a stuffing box is provided with the complete tubular shaft being supported on a foundation with the aid of a rolling-contact bearing combination. The rotary drive of the tubular shaft includes a plurality of geared motors which are installed on the toothed rim of the tubular shaft with the aid of special tracks.

SUMMARY OF THE INVENTION

It is an object of the invention to improve the extraction tower described above so that its production costs are reduced.

According to the invention, this object is met by providing an extraction tower for the extraction of slices including an outer tower casing having an inside wall and a bottom region; arresters disposed along the inside wall; a sieve disposed in the bottom region; a tubular shaft centrally disposed is the casing and having a toothed rim at a top end thereof and conveyor vanes disposed over its length; a bearing which holds a bottom end of the tubular shaft; a rotary drive including a plurality of drive units which are distributed around a periphery of the tubular shaft and which are connected to the tower casing, each of the drive units including a drive pinion which engages the toothed rim; a plain bearing; and a guide for guiding the bottom end in the bottom region near the bottom sieve, the guide including a central journal which is disposed in the plain bearing as far as the bottom sieve extends and wherein a clearance exists between the plain bearing and the bottom sieve.

The stuffing box, the rolling-contact bearing combination and the foundation for the bottom mounting of the tubular shaft which are typically used in conventional extraction towers are thus replaced, in accordance with the invention, by a simple plain bearing which can be produced at low cost and which in addition can have a relatively large clearance, thereby permitting slight pendulum movements of the tubular shaft. As the mounting of the bottom end of the tubular shaft in the region of the bottom sieve requires only a relatively small central journal having a small diameter, the bottom sieve can now be extended up to the plain bearing and thus extends over the majority of the diameter of the tower casing. Because of this great increase in the sieve area as compared to previously known solutions, it is possible to reduce the loading on the bottom sieve and at the same time to dispense entirely with the expensive side sieve elements in the region of the tower casing, which were previously necessary in the prior art devices. At the same time, it is now possible for the bottom sieve to have a central support, which at the same time can be in the form of a central pumping-in pipe for the mixture of slices and juice.

For the above-described enlargement of the bottom sieve, it is expedient for the bottom end of the tubular shaft to have a bottom which slightly tapers conically in the downward direction.

The actual mounting of the tubular shaft is, in its top region, in the form of a large bearing. It is advantageous to provide in the top end of the tower casing a drive platform which is movably supported on the latter and which is equipped with the drive units and has a four-point bearing which forms a ball bearing rotary connection on which the top end of the tubular shaft is mounted. Movements caused by manufacturing tolerances in the tubular shaft are thus entirely transmitted to the drive platform. Thus, during operation of the extraction tower, there are no angle errors created. Because of the movable support of the drive platform in the outer body section of the tower casing, radial and axial movements, that is to say so-called wobbling movements, resulting from manufacturing tolerances, thermal expansion or the like, can be compensated for.

The individual drive units are, according to the invention, movably suspended and can be accurately adjusted with respect to the distance between axes of the drive unit and the tubular shaft, and can be aligned relative to the toothed rim. For this purpose it is advantageous for the movable suspension to include a pivoted lever which is pivotable in a horizontal plane and which at its one end is pivoted on the outer edge of the drive platform and at its free end carries a drive unit. The free end of the pivoted lever is acted on by a first articulated support which is pivotally connected to the drive platform and which is variable in length, such that through the adjustment of the length of the articulated support, the drive unit is pivoted, approximately radially relative to the drive platform, in relation to the toothed rim.

The pivoted lever serves on the one hand as a support to take the torque generated during operation, and on the other hand, by a variation of the length of the first articulated support, permits adjustment of the distance between the axes of the drive pinion and the toothed rim.

In order also to be able to adjust a parallel alignment of the drive pinion with the toothed rim, it is advantageous for the movable suspension to include a second articulated support, which is variable in length and which at its one end is pivoted on the drive platform (first pivot point) and by its other end acts, axially above or below the first pivot point, on the drive unit.

A pipe can be disposed in the tubular shaft in order to introduce and vary the level of water within the tubular shaft. The use of such a pipe is advantageous because in previously known constructions it was not possible to control the buoyancy of the tubular shaft by varying the water therein, because a central shaft journal with a spider attached to it and extending outwards to the wall of the tubular shaft prevented the installation of such a pipe.

The side sieves which were customarily used in prior art devices and the corresponding reinforcements required in the outer body section region for such side sieves are no longer needed in the instant invention. Since the bottom sieve can be made larger than the bottom sieves of prior art devices, side sieves are not required since the enlarged sieve compensates for and accomplishes the function of the side sieves.

The advantage of the inventive mounting of the tubular shaft, including the drive structure, provides a greater operating reliability. In large constructions such as extraction towers, there is a disadvantage in that great manufacturing tolerances exist. Thermal influences also lead to variation of the prescribed structural dimensions. With the outdoor installations customary at the present time, a wind striking against one side can result in varying expansions of the tower body. The new system reacts flexibly to these influences, without impermissibly heavy bearing forces or variations of tooth engagement occurring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a plan view of a holder for a drive unit according to FIG. 4.

DETAILED DESCRIPTION OF THE PREFERRED EMBODIMENT

Figure 1:
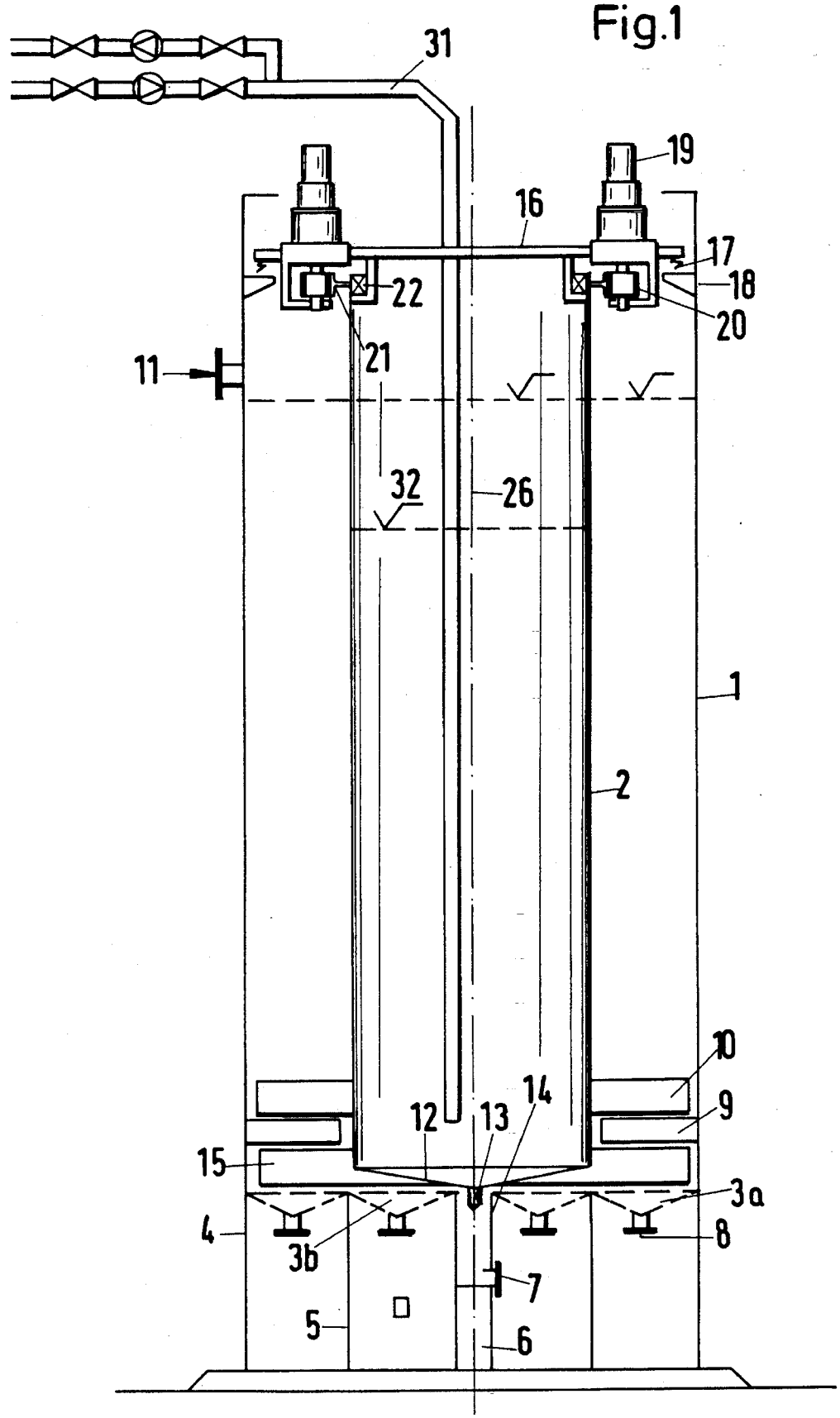
FIG. 1 is a longitudinal section of an extraction tower.

The extraction tower illustrated in FIG. 1, which is used for the extraction of slices, includes a tower casing 1, which has a circular cross-section and is composed of a plurality of body sections disposed one above the other, and a tubular shaft 2 concentrically arranged for rotation inside the tower casing 1. In the bottom body section of the tower casing 1, a bottom sieve 3 is provided. The bottom sieve includes an outer annular region 3a and an adjoining inner annular region 3b.

The bottom sieve 3 is supported by means of an outer standing section 4, a middle standing section 5 disposed between the two annular regions 3a, 3b, and a central pipe 6, which at the same time is in the form of a pumping-in pipe 7 for providing the mixture of slices and juice. The two annular regions 3a, 3b of the bottom sieve 3 are equipped with outlet connections 8 for the discharge of raw juice.

The inside wall of the tower casing 1 is equipped with optionally adjustable baffles 9, known as arresters, which cooperate with conveyor vanes 10 that are provided on the tubular shaft 2 over the greater part of its length. Each of the adjustable baffles 9 correspond to a corresponding conveyer vane 10. Through the differential movement between the rotating conveyor vanes 10 and the stationary baffles 9, the mixture of slices and juice which is pumped in at the bottom of the casing through the inlet pipe 7 above the bottom sieve 3, is conveyed upwards inside the tower casing 1. Fresh extraction water 11 is introduced in the top region of the tower casing and passes downwards countercurrently to the movement of the slices, and is drawn off via the bottom sieve 3 or its outlet connections 8. The leached slices arriving at the top of the tower are ejected, for example, by means of drawing-out worms (not shown).

The bottom end of the tubular shaft 2 has a bottom 12 which tapers slightly conically in the downward direction and which is equipped with a downwardly projecting central journal 13, which is guided with considerable clearance in a plain bearing 14 in the form of a catch bearing. In FIG. 1, it can be seen that the bottom sieve 3 extends from the wall of tower casing 1 as far as the plain bearing 14. Distributors 15 are disposed at the bottom end of the tubular shaft 2 and rotate with the tubular shaft 2 to ensure uniform distribution, above the bottom sieve 3, of the mixture of slices and juice which is pumped to that point via pumping in pipe 7.

In the top end of the tower casing 1, a drive platform 16 is provided and is movably supported on supports 17 and is connected to tubular shaft 2. The supports 17 are mounted on brackets 18 which are connected to the inner wall of the tower casing 1. The supports 17 are resilient devices and can be for example, vibration mountings of rubber, springs, or hydraulic pistons connected together by tubing, so that a random movement of the shaft 2 is permitted by exchange of liquid between the pistons. Thus, the platform 16 is movable to accomodate any movement of the tubular shaft 2. The movability of this supporting system is selected so that radial and axial movements (wobbling movements) due to manufacturing tolerances, thermal expansion and the like, are compensated for.

Figure 4:
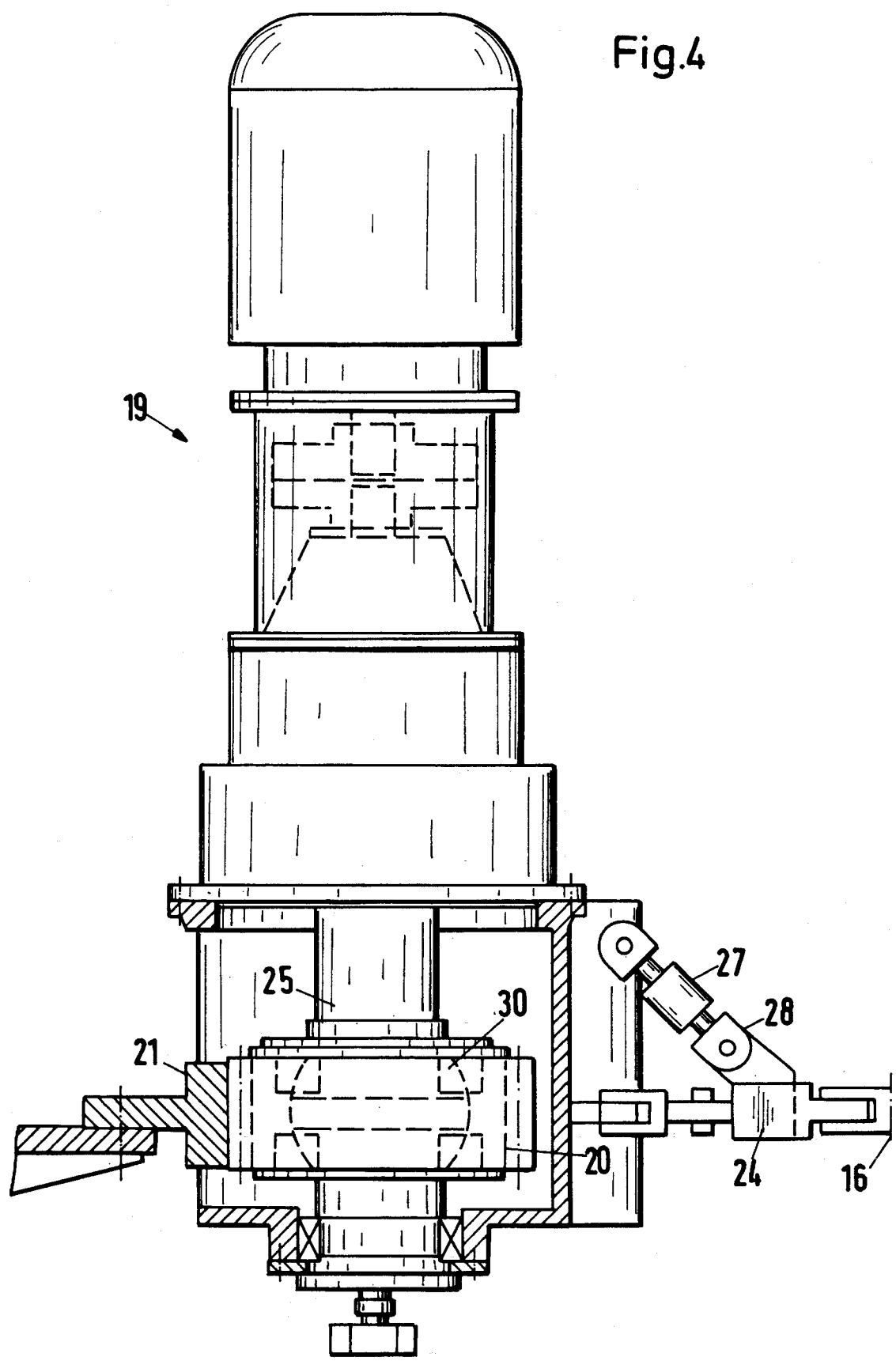
FIG. 4 shows a drive unit on an enlarged scale.

The rotary drive for the tubular shaft 2 includes a plurality of drive units 19, of which one is shown in detail and partly in longitudinal section in FIG. 4. A plurality of drive units 19 are distributed around the periphery of the tubular shaft 2, with each of the drive units 19 engaging, by means of a drive pinion 20, a toothed rim 21 provided on the tubular shaft 2.

Figure 2:
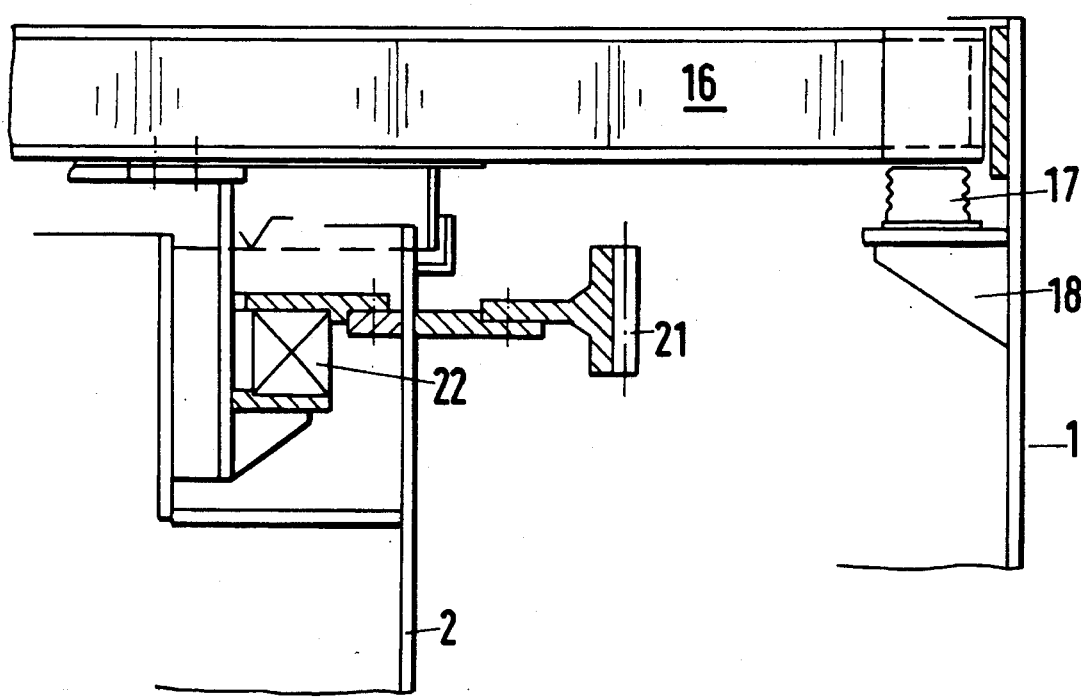
FIG. 2 shows on a larger scale a detail of a portion of FIG. 1.
Figure 3:
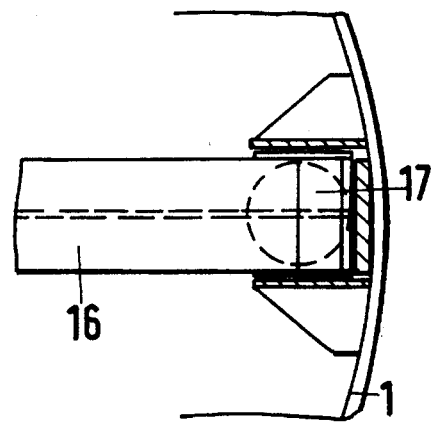
FIG. 3 is a plan view of the detail shown in FIG. 2.

The complete tubular shaft 2 is connected to the drive platform 16 in its top region by means of a four-point bearing 22 forming a ball bearing rotary connection. Any movements occurring, for example because of manufacturing tolerances in the rotary shaft 2, are thus entirely transmitted to the drive platform 16, such that during operation of the extraction tower no angle errors can occur. It can be seen in FIG. 2 that the four-point bearing 22 lies in the interior of the tubular shaft 2.

Each drive unit 19 is movably suspended on the drive platform 16. For this purpose, a pivoted lever 23 (see FIG. 5) pivotable in a horizontal plane is provided. The pivoted lever 23 is pivoted at one end on the outer edge of the drive platform 16 and is formed at its free end 23a as a fork-shape. The free end 23a acts as a holder for a drive unit 19 which is to be mounted vertically therein. On the free end 23a of the pivoted lever 23, a first articulated support 24 is pivotally mounted. The other end of the articulated support 24 is pivotally supported on the drive platform 16. The articulated support 24 is constructed to be variable in length. Variation of the length of the first articulated support 24 leads to the pivoting, approximately radially relative to the drive platform 16, of the associated drive unit 19, and thus serves to adjust the distance between the axis of the pinion shaft 25 and the axis of rotation 26 of the tubular shaft 2. The movable suspension of the drive unit 19 also includes a second articulated support 27, the length of which is variable. Second articulated support 27 is pivoted at its one end at a first pivot point 28 on the drive platform 16 and by its other end acts, axially above the first pivot point 28, on the drive unit 19. Through a variation of the length of the second articulated support 27, the drive pinion 20 can be adjusted to be in exact parallel alignment with the toothed rim 21. That is, the flanks of the teeth of the toothed rim 21 and teeth of drive pinion 20 can be adjusted to be parallel. The first and second articulated supports 24, 27 are each for example, a threaded bolt and threaded sleeve device. The lengths of the supports are varied by turning the threaded sleeves.

The pivot point 29 of the pivoted lever 23 in the outer edge region of the drive platform 16 forms at the same time a support to take the torque generated during operation of the tower.

The drive pinion 20 of each drive unit 19 is mounted in a spherical calotte 30, whereby slight inaccuracies can be compensated for by the drive pinion 20 itself, and thus the contact pattern between the pinion 20 and the toothed rim 21 is almost 100% accurate as compared to the desired contact pattern.

Do to the use of the large bearing, it is possible to provide in the tubular shaft 2, a pipe 31 by means of which the entry and level 32 of water in the tubular shaft 2 can be varied. Through the variation of the water level 32, that is to say by adding or removing water, loading of the bottom plain bearing 14 and other components can be prevented or changed due to the buoyancy effect, which acts on the tubular shaft 2. The load on the plain bearing 14, can therefore be adjusted by regulating the amount of water within tubular shaft 2. In order to be able to adjust or regulate the prescribed downwardly directed load, it is advantageous for the drive platform 16 to be supported on the tower casing with the interposition of pressure pickups. The pressure pickups produce measurement signals indicative of load which can be used to control the filling of the tubular shaft 2. That is, based on the measured load, the filling of the tubular shaft can be controlled until a desired load is reached and detected by the pressure pickups. The pressure pickups may work hydraulically or electrically and, by way of their measurement signals, control, for example, a filling valve provided in the pipe 31. The pressure pickups can be the resilient supports 17 or a pressure device mounted on or within the supports 17.

Additionally, advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An extraction tower for the extraction of slices, comprising:

an outer tower casing having an inside wall and a bottom region;

arresters disposed along said inside wall;

a sieve disposed in said bottom region;

a tubular shaft centrally disposed in said casing and having a toothed rim at a top end thereof and conveyor vanes disposed over its length;

a plain bearing which holds a bottom end of said tubular shaft;

a rotary drive including a plurality of drive units which are distributed around a periphery of said tubular shaft and which are connected to the tower casing, each of said drive units including a drive pinion which engages said toothed rim; and means for guiding said bottom end in said bottom region near said sieve, said guiding means including a central journal which is disposed in said plain bearing as far as said sieve extends and wherein a clearance exists between said plain bearing and said central journal.

2. An extraction tower as claimed in claim 1, further comprising a central pipe which supports said sieve and through which a mixture of slices and juice can be pumped into said casing.

3. An extraction tower as claimed in claim 1, further comprising a standing body section and wherein said sieve includes an outer sieve annular region and an adjoining inner sieve annular region, and said standing body section is disposed between said outer and inner sieve annular regions and supports said sieve.

4. An extraction tower as claimed in claim 1, wherein said bottom end of said tubular shaft has a bottom which slightly tapers conically in a downward direction.

5. An extraction tower as claimed in claim 1, further comprising a drive platform which is movably supported by said tower casing at a top end thereof, drive units mounted on said drive platform, and a four-point bearing which is connected to said drive platform and on which said top end of said tubular shaft is mounted such that said four-point bearing forms a ball bearing rotary connection between said platform and said tubular shaft.

6. An extraction tower as claimed in claim 5, wherein said four-point bearing lies in the interior of said tubular shaft.

7. An extraction tower as claimed in claim 5, further comprising means for movably suspending each of said drive units on said drive platform.

8. An extraction tower as claimed in claim 7, further comprising a first articulated support which is pivotally connected to said drive platform and which is variable in length, and wherein said movably suspending means comprises a lever having a first end which is pivotably connected on an outer edge of said drive platform such that said lever is pivotable in a horizontal plane, and a second end which is free and which carries at least one drive unit, said second end of said lever being engaged by said first articulated support such that at times when the length of said first articulated support is varied, said drive unit is pivoted approximately radially relative to said drive platform and in relation to said toothed rim.

9. An extraction tower as claimed in claim 7, wherein the movably suspending means further includes a second articulated support which is variable in length and which at one end is pivotally connected to said drive platform at a pivot point, and at another end engages said drive unit axially above or below said first pivot point.

10. An extraction tower as claim 1, further comprising a plurality of spherical calottes, each of said drive pinions being mounted in a corresponding one of said spherical calottes.

11. An extraction tower as claimed in claim 5, further comprising pressure pickups disposed between said drive platform and said tower casing, said pressure pickups providing measurement signals indicative of load.

12. An extraction tower for the extraction of slices, comprising:

an outer tower casing having an inside wall and a bottom region;

arresters disposed along said inside wall;

a sieve disposed in said bottom region;

a tubular shaft centrally disposed in said casing and having a toothed rim at a top end thereof and conveyor vanes disposed over its length;

a plain bearing which holds a bottom end of said tubular shaft;

a rotary drive including a plurality of drive units which are distributed around a periphery of said tubular shaft and which are connected to the tower casing, each of said drive units including a drive pinion which engages said toothed rim; and means for guiding said bottom end in said bottom region near said sieve, said guiding means including a central journal which is disposed in said plain bearing as far as said sieve extends and wherein a clearance exists between said plain bearing and said central journal further comprising a water supply pipe disposed in said tubular shaft such that water can be supplied within said tubular shaft via said water supply pipe in order to vary a level of water within said tubular shaft.

13. An extraction tower as claimed in claim 12, further comprising means for controlling the level of water within said tubular shaft, said controlling means including pressure pickups disposed between said drive platform and said tower casing, said pressure pickups producing signals indicative of load.

14. An extraction tower, comprising:

a tower casing;

arresters disposed within said tower casing;

a tubular shaft disposed in said tower casing, said shaft having conveyor vanes which operatively cooperate with said arresters;

a sieve disposed in said tower casing;

means connected to said tubular shaft for rotating said tubular shaft;

means for mounting a bottom end of said tubular shaft in said tower casing such that pendulum movement of said shaft is permitted.

15. An extraction tower as recited in claim 14, further comprising a drive platform being movably supported on said tower casing, and a rotatable connection connecting said tubular shaft to said drive platform.

16. An extraction tower as recited in claim 15, wherein said means for rotating includes a plurality of drive units movably suspended from said drive platform.

17. An extraction tower as recited in claim 16, further comprising means for adjusting a distance between said tubular shaft and at least one of said drive units.

18. An extraction tower as recited in claim 17, further comprising mean for aligning said at least one of said drive units relative to said shaft, and a toothed rim mounted on said shaft, and wherein said at least one of said drive units includes a pinion and said aligning means can align said pinion to be approximately parallel with said toothed rim.

19. An extraction tower for the extraction of slices, comprising:

an outer tower casing having an inside wall and a bottom region;

arresters disposed along said inside wall;

a sieve disposed in said bottom region;

a tubular shaft centrally disposed in said casing and having a toothed rim at a top end thereof and conveyor vanes disposed over its length;

a plain bearing which holds a bottom end of said tubular shaft;

a rotary drive including a plurality of drive units which are distributed around a periphery of said tubular shaft and which are connected to the tower casing, each of said drive units including a drive pinion which engages said toothed rim; and means for guiding said bottom end in said bottom region near said sieve, said guiding means including a central journal which is disposed in said plain bearing as far as said sieve extends and wherein a clearance exists between said plain bearing and said central journal further comprising a drive platform which is movably supported by said tower casing at a top end thereof, drive units mounted on said drive platform and a bearing which is connected to said drive platform and on which said top end of said tubular shaft is mounted such that said bearing forms a rotary connection between said platform and said tubular shaft.

* * * * *